May 21, 1957  P. MAURET  2,792,706
MOISTURE TESTER
Filed Dec. 11, 1953
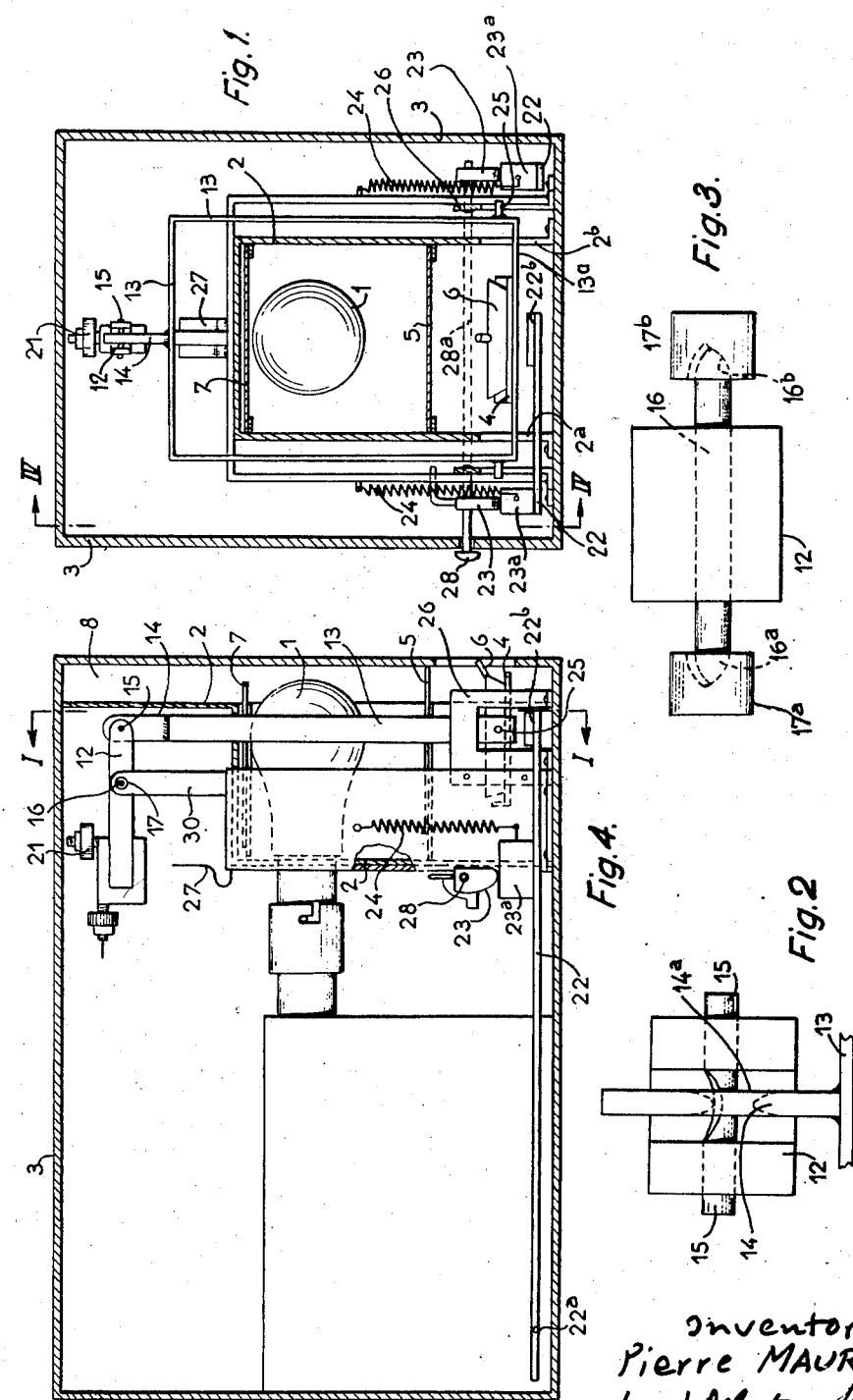
Inventor:
Pierre MAURET
by: J. Delatu-Segny
Attorney

2,792,706

MOISTURE TESTER

Pierre Mauret, Clermont-Ferrand, France

Application December 11, 1953, Serial No. 397,750

Claims priority, application France July 15, 1953

6 Claims. (Cl. 73—76)

The present invention relates to a precision weighing machine of the single-pan balance type, more particularly such a machine adapted for use in automatic equipment for measuring the variations in weight of a body subjected to some external influence, such as heat.

It is the object of the invention to provide a high-precision balance assembly for laboratory or industrial use, which will be rugged and will not require any special precautions to be taken for transportation.

More specifically the invention is directed to the use, in place of the central knife-edge of the balance, of a pivot device of specific characteristics to be later described, and to the construction of the pan suspension means in the form of annular pivots whereby all of the moving parts of the balance will be adapted to be blocked by operation of a single knob or the like.

In particular the said pivots may include both operating bearings and idler bearings, the operating bearings being disabled on actuation of the blocking means, whereby all of the moving parts will then be blocked against the idler bearings for transportation of the balance.

The above provisions impart both ruggedness and sensitivity to the resulting weighing machine.

In the exemplary embodiment illustrated,

Fig. 1 is a diagrammatic side view of apparatus including the improved balance of the invention;

Fig. 2 is a diagrammatic view of the knife-edge pivot assembly supporting the pan;

Fig. 3 is a diagrammatic view of the pivot supporting the beam, and

Fig. 4 is a diagrammatic side view corresponding to Fig. 1.

In the illustrative embodiment shown the reference 1 designates a source of electromagnetic radiations generally comprising an electric lamp supplied from the power network and positioned in an insulating enclosure 2 made of polished stainless metal serving as a reflector therefor, the walls of said enclosure defining a subdivision in the general casing 3 of the apparatus.

Positioned within the enclosure 2 below the source 1 is the pan 4 of the balance. The pan 4 is adapted to be struck by radiation from the source, either directly or as shown through an interposed filter 5 adapted to arrest all but a predetermined frequency range of said radiations. When the filter is replaced with an opaque screen the pan will be completely isolated from the radiation. The pan 4 may comprises a stainless metal sheet or plate which may be solid or perforate.

A door or cover (not shown) provided in a wall of the enclosure 2, on the right side thereof as shown, permits introducing into the enclosure a cup or tray 6 containing the substance to be tested which may be placed either directly upon the pan of the balance, or upon the isolating screen when operating at high temperature. Depending on the type of material to be tested the container or dish may be made of stainless metal perforate or imperforate, or it may be made of glass, porcelain, or the like.

A suitable set of slidably adjustable baffle plates 7 is provided for controlling the airflow through the enclosure, the air being adapted to be discharged up a flue 8 and suitable vents not shown.

The pan 4 is suspended from the balance beam 12 through a pair of rods 13 extending outside the enclosure 2 through a pair of small apertures 2a, 2b, and connected with pan-supporting horizontal arm 13a. The suspension means for the pan are illustrated in Fig. 2. The rods 13 are connected with a strip 14 of treated preferably stainless steel, formed with a hole 14a therein which is cut away on both sides and has a rounded inner wall. A pin 15 cut to a "half-moon" knife-edge shape extends through the hole and supports the pan assembly through punctual contact engagement. The pin is riveted to the beam.

The upper edge of the hole 14a constitutes an operative bearing while the lower edge constitutes the idling bearing used when the balance pan is raised by the blocking device as later explained.

The beam 12 (Fig. 3) comprises a pivot shaft 16 made of preferably stainless, treated steel terminating in two ogival-tapered tips 16a and 16b which rest in corundum bearings 17a and 17b of concave ogival form, of somewhat larger taper angle than the tips. Said pivot is supported by member 30 secured to the top of the enclosure.

The concave bottom part of the pivot bearings constitutes the operating bearing surfaces while the upper parts provide idling bearings serving when the pan is raised by the blocking device as later described.

The blocking device essentially comprises a pair of levers 22 pivoted at 22a, two cams 23 engaging projections 23a of said levers, said cams being operated from a common knob 28 which drives a common shaft 28a, and two springs 24. An arm 22b projecting through aperture 2a into the enclosure 2 is adapted to engage with its extremity under the pan 4 and lift it by the action of springs 24 on retraction of the cams 23, until the fingers 25 secured to rods 13 and projecting outside the enclosure 2 have engaged the under surface of the inner top walls of the apertures formed in parts 26 disposed laterally against the enclosure 2. A semi-yielding stop 27 limits the rocking motion of lever 12 rearwards when the pan 4 has been raised.

In practice when the pan 4 is lifted by acting on knob 28 the rear part of the beam engages the yielding stop 27 and a very short time later the fingers 25 engage the internal contour of parts 26. In such condition the bottom part of the hole in strip 14 will, after the beam has engaged its abutment, engage the rounder lower part of pin 15, while the ends of the beam pivot shaft 16 engage the upper parts of the taper recesses formed in the bearings 17. With the beam thus lifted the balance is completely blocked.

Disposed in the remaining part of the casing are the remaining components of the apparatus, such as an optical system responsive to the weight variations and a photoelectrical recording system for recording the variations in electric voltage corresponding to the displacements of the pan.

What I claim is:

1. An apparatus for measuring the variations in weight of a body subjected to an external influence, which comprises: a casing; an enclosure internal to and attached to said casing and having side walls; a source of heat radiation in said enclosure and a single pan positioned in the bottom of said enclosure below said source; a horizontal arm supporting said pan and projecting through slots in the side walls of said enclosure; a balance beam in said casing; suspension rods connecting said balance beam with said horizontal arm, and extending along opposite side walls of said enclosure outside the latter; and a central knife-edge assembly located in said casing for supporting said balance beam and comprising a pivot and a supporting member secured to the top of said enclosure and supporting said pivot.

2. Apparatus as claimed in claim 1, wherein said supporting member comprises a pair of coaxial pivot seats, each having a substantially conical concave seating surface, in which the hardened ends of said pivot are received with clearance, said ends being shaped to a substantially conical form having a smaller taper angle than that of the complementary concave seating surfaces.

3. Apparatus according to claim 2, wherein the end of the balance beam carries a horizontal cylindrical pin having a medial section shaped as a half-moon knife-edge with its sharp edge directed upwards, said pin receiving a steel strip on said medial section, a hole formed in said strip and having a diameter slightly larger than the diameter of said pin, the inner edge of said hole having a rounded contour, said strip being connected with said suspension rods.

4. Apparatus as claimed in claim 3, which includes means for lifting said pan, a yielding abutment for limiting the upward rocking movement of the beam, said pan being adapted to move upwardly a small amount after the beam has been arrested by said abutment until the complementary surfaces of the beam pivot and seats on the one hand, and the pin and strip on the other hand, have disengaged one another.

5. Apparatus as claimed in claim 4, wherein fingers carried by the pan are adapted to engage an abutment of the casing at the same time as the ends of said beam pivot engage the tops of said seating surfaces and the bottom edge of said hole in the strip engages the bottom edge surface of said pin.

6. Apparatus as claimed in claim 4, wherein the pan lifting means comprise two arms extending on opposite sides of said enclosure and pivoted to said casing, said arms being springbiassed upwardly, at least one cam for blocking said arms in a lowermost position corresponding to the released condition of the pan, the free ends of said arms being adapted to exert upward pressure on said pan on actuation of a control knob controlling said cams.

References Cited in the file of this patent

FOREIGN PATENTS

| | | |
|---|---|---|
| 604,863 | Great Britain | July 12, 1948 |
| 954,278 | France | June 6, 1949 |
| 873,453 | Germany | Apr. 13, 1953 |